UNITED STATES PATENT OFFICE.

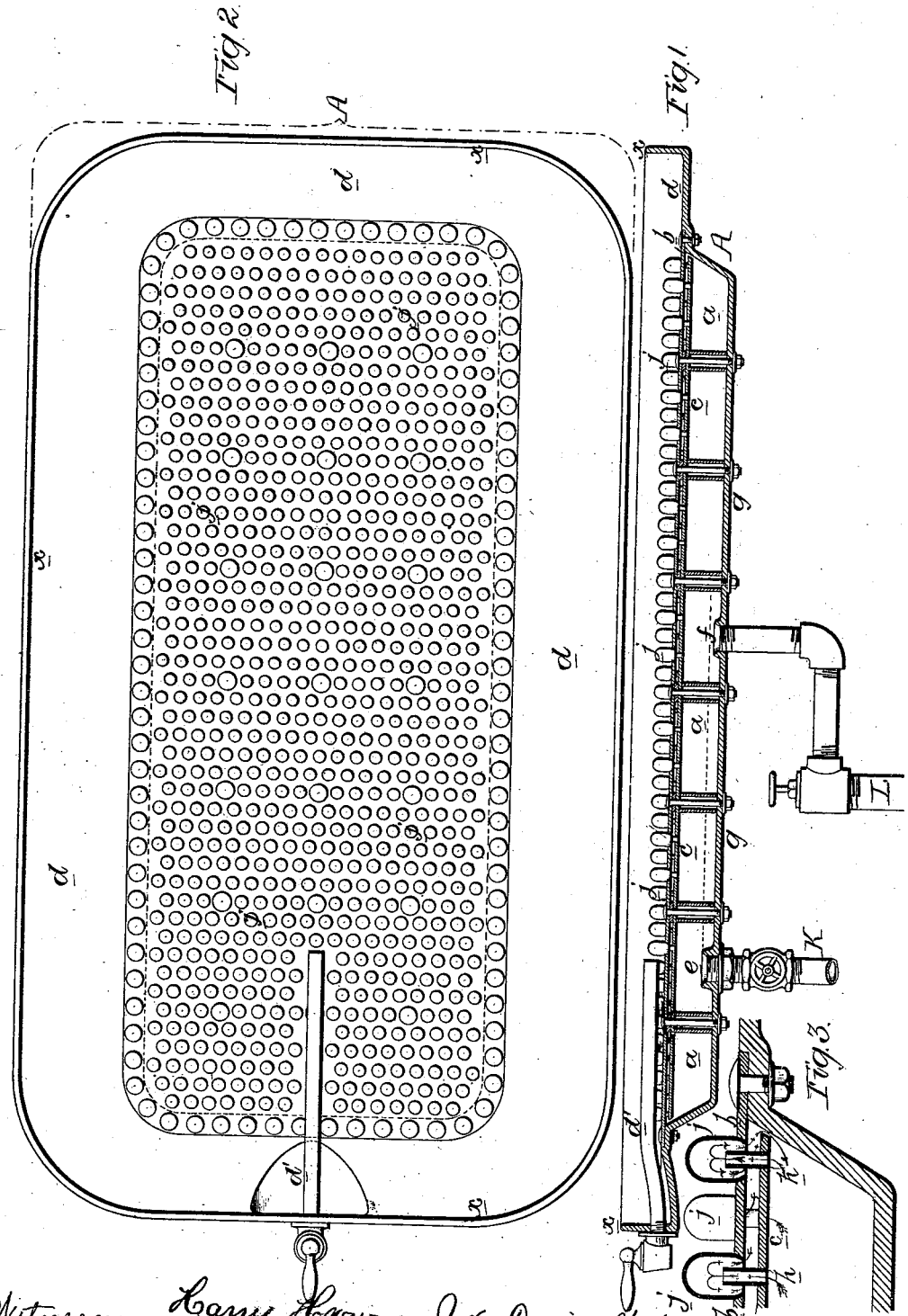

DAVID WATSON, OF HAVANA, CUBA.

IMPROVEMENT IN OPEN-PAN JUICE-EVAPORATORS.

Specification forming part of Letters Patent No. 186,646, dated January 23, 1877; application filed June 16, 1876.

*To all whom it may concern:*

Be it known that I, DAVID WATSON, of Havana, Cuba, have invented certain Improvements in Open-Pan Juice Evaporators or Concentrators, of which the following is a specification:

My invention relates to certain improvements in juice evaporators or concentrators, and the main object I have in view is to facilitate the separation of the impurities contained in the juice during the process of evaporation, by taking advantage of the action of heat in creating currents; and this I attain in the manner which I now proceed to describe, reference being had to the accompanying drawing, in which—

Figure 1 is a vertical section of my improved evaporating apparatus; Fig. 2, a plan of the same; Fig. 3, a detached view on an enlarged scale, illustrating part of my invention; and Fig. 4, a view of a modification.

A is the pan, which consists of a steam-chamber, $a\ a$, a heating-surface, $b$, a false bottom, $c$, a cooling-border, $d$, and a discharge-pipe, $d'$. The steam-chamber $a\ a$ consists of a shallow tray, $g$, having an entrance, $e$, for the admission of steam, and an exit, $f$, for water resulting from the condensation of the steam. Near the upper portion of this chamber is placed a plate, $c$, which, for convenience, I will hereafter refer to as a "false bottom," and which has a number of openings formed over the surface, and to these openings are secured the lower ends of the tubes $h$, employed to direct the steam, in the manner hereinafter described. Above the false bottom $c$, and fastened to the flange of the steam-chamber $a\ a$, is the heating-surface $b$. This consists of a plate having holes in which are fitted, at their lower ends, a number of dome-shaped shells, $j$. Surrounding this heating-surface is the cooling-border $d$, which forms part of, or may be fastened to, the flange of the steam-chamber $a\ a$. It has a raised rim, $x$, thus forming the receptacle for the juice. At one end it has a discharge-cock, to which is connected the discharge-pipe $d'\ d'$. Between the edges of the false bottom $c$ and the inner surface of the steam-chamber $a\ a$ is a space left for the escape of condensed water. This false bottom is so placed that the upper end of each of the tubes it contains projects up into the interior of a corresponding shell in the heating-surface $b$, leaving sufficient space between the two for the free passage of steam and water, as shown in Fig. 4.

In order to secure the steam-chamber $a$, the heating-surface $b$, and the false bottom together, and at proper distances apart, a number of bolts and sockets are employed.

The discharge-pipe $d'\ d'$ has its open or inlet end placed over the portion of the heating-surface $b$ which lies directly above the steam-entrance $e$ in the chamber below, and is so placed with the object of carrying off the cleanest portion of the juice during the process of ebullition, as required, it being a well-known fact that the cleanest juice is always found at the point of greatest heat. I do not, however, restrict myself to the use of a tube placed in precisely the manner above described, but may otherwise place it, having its inlet end in any part of the heating-surface where there is active ebullition, or may pass it up through the bottom of the heating-surface.

K is the steam-supply pipe with valve attached. L is a steam-trap for the escape of the condensed water.

The steam enters the chamber $a\ a$ through the opening $e$, rises through the tubes $h$, and impinges upon the inside of the domes of the shells $j$; thence passes downward between the inner side of said shells and the outer side of the tubes $h$. The condensed water which is formed flows toward the edges of the false bottom $c$, passes through the space left at the edges, and, trickling down the sloping sides of the steam-chamber, escapes by the opening $f$, being prevented from running out through the steam-entrance by a raised border, which surrounds the mouth of the latter. As the shells $j$ become sufficiently heated, the juice boils, and is thrown outward by the action of the heat toward the cooling-border $d$, where, upon the cessation of the ebullition, the scum gathers and remains, being kept there by the outward current. In consequence of the cooling-border having no heat directly applied to it, the juice is so far cooled that ebullition there ceases. The accumulations of scum may be removed when convenient by means of a skimmer. The discharge is effected by opening the cock to which is attached the discharge-pipe $d'$ $d'$.

I do not confine myself to the use of one pan, as above described, but intend to use two or more in combination as a train, making suitable modifications. When, for instance, the juice under treatment is saccharine juice, the last pan or evaporator would have no cooling-border, because there would be no need for the continuation in it of the cleaning process; but this pan would have a higher rim, because this would be required to prevent the boiling over of the juice. In such a pan the saccharine juice may be brought to the granulating-point. Filters for the decolorization of the juice may also be used in connection with the pans.

I wish it to be understood that I do not desire to claim, separately, in this application, either the cooling-border, the central discharge, or the heating-surface of small shells, as these elements have long been used in apparatus of the character to which my invention relates; but

I claim as my invention—

1. An evaporating-pan having a central heating-surface, $b$, and flat cooling-surface $d$, entirely surrounding and communicating directly with the heating-surface, so as to be adapted for the collection and removal of scum without waste of juice, as set forth.

2. The combination of an evaporating-pan having a cooling-border, $d$, with a discharge-passage, $d'$ $d'$, having its inlet at or near the point of fiercest ebullition, as set forth.

3. The combination, in an open shallow pan, of the cooling-border $d$, around the edge, with a central heating-surface, formed chiefly of small shells $j$, as described.

In testimony whereof I have signed my name to this specification in the presence of two subscribing witnesses.

DAVID WATSON.

Witnesses:
J. A. SPRINGER,
L. V. SCHMIDT.